US006471810B2

(12) United States Patent
Sawano

(10) Patent No.: US 6,471,810 B2
(45) Date of Patent: Oct. 29, 2002

(54) IMAGE TRANSFER METHOD

(75) Inventor: Mitsuru Sawano, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/772,976

(22) Filed: Jan. 31, 2001

(65) Prior Publication Data

US 2001/0035260 A1 Nov. 1, 2001

(30) Foreign Application Priority Data

Feb. 2, 2000 (JP) ....................................... 2000-025396

(51) Int. Cl.[7] ............................ B44C 1/16; B41M 3/12; B32B 31/20; B03C 8/50; B41F 16/00

(52) U.S. Cl. ....................... 156/230; 156/239; 156/240; 156/247; 156/277; 156/289; 156/555; 427/146; 427/148; 430/252

(58) Field of Search ................................ 156/228, 230, 156/234, 237, 246, 241, 247, 277, 287, 244.16, 244.17, 324.4, 555, 580, 583.3; 271/281, 285, 900; 430/252, 253, 254, 358; 427/146, 147, 148

(56) References Cited

U.S. PATENT DOCUMENTS

| | | | | |
|---|---|---|---|---|
| 5,031,773 A | * | 7/1991 | Manico et al. .............. | 206/455 |
| 5,531,854 A | * | 7/1996 | Kerr et al. .................. | 156/234 |
| 5,762,752 A | * | 6/1998 | Sawano et al. ............. | 156/580 |
| 6,146,490 A | * | 11/2000 | Ensign .................... | 156/324.4 |

FOREIGN PATENT DOCUMENTS

| | | | | |
|---|---|---|---|---|
| JP | 10-020274 | * | 8/1998 | ........... B29C/63/02 |
| JP | 11-058516 | * | 3/1999 | ........... B29C/63/02 |
| JP | 11-207925 | * | 8/1999 | ........... B41F/16/00 |

* cited by examiner

*Primary Examiner*—Jerry A. Lorengo
(74) *Attorney, Agent, or Firm*—Sughrue Mion, PLLC

(57) ABSTRACT

First, an image receiving sheet is put on an insertion table of an image transfer device, next, the paper is overlapped on the image receiving sheet, then, a flexible hygroscopic carrier sheet is further overlapped on them and they are inserted between the pair of heat rollers in that state.

7 Claims, 6 Drawing Sheets

FIG. 3

| | PAPER | GUIDE PAPER | DETERMINATION OF TEST RESULT | | | |
|---|---|---|---|---|---|---|
| | TYPE: LIGHT COAT | WHETHER GUIDE PAPER IS USED OR NOT | TRANSFER SPEED [ mm/s ] | | | |
| | (BASICS WEIGHT) | TYPE/BASIS WEIGHT IF USED | 6 | 10 | 15 | 20 |
| COMPARATIVE EXAMPLE 1 | 105 [ $g/m^2$ ] | UNUSED | ○/× | ○/× | ○/○ | ×/○ |
| COMPARATIVE EXAMPLE 2 | 79 [ $g/m^2$ ] | UNUSED | ○/× | ○/× | ○/× | ×/○ |
| COMPARATIVE EXAMPLE 3 | 64 [ $g/m^2$ ] | UNUSED | ○/× | ○/× | ○/× | ○/× |
| EXAMPLE 1 | 64 [ $g/m^2$ ] | ART 128 [ $g/m^2$ ] | ○/× | ○/○ | ○/○ | ×/○ |
| EXAMPLE 2 | 64 [ $g/m^2$ ] | LIGHT COAT 78 [ $g/m^2$ ] | ○/× | ○/× | ○/○ | ×/○ |
| COMPARATIVE EXAMPLE 4 | 64 [ $g/m^2$ ] | LIGHT COAT 64 [ $g/m^2$ ] | ○/× | ○/× | ○/× | ×/× |
| EXAMPLE 3 | 105 [ $g/m^2$ ] | ART 157 [ $g/m^2$ ] | ○/× | ○/○ | ○/○ | ×/○ |
| COMPARATIVE EXAMPLE 5 | 105 [ $g/m^2$ ] | ART 105 [ $g/m^2$ ] | ○/× | ○/× | ○/× | ×/○ |

PRIOR ART

PRIOR ART

IMAGE TRANSFER METHOD

BACKGROUND OF THE INVENTION

The present invention relates to an image transfer device that transfers an image formed on an image receiving sheet on paper by overlapping the image receiving sheet where the image is formed by a thermal transfer printer, a laser thermal transfer printer and others (any printer that can print on transfer paper such as an ink-jet printer) and the paper for the image to be transferred and passing it between a pair of heat rollers.

In case the printing of multiple copies is performed based upon a color manuscript, a printout is acquired after proof print is performed and finishing is verified. At this time, in a proof print process, a color proof is prepared and is verified. Such a color proof is acquired by transferring an image formed on an image receiving sheet on paper by an image transfer device after the image is formed on the image receiving sheet by a thermal printer and others.

FIG. 6 shows a general image transfer device that can be also used in the invention. As shown in FIG. 6, a reference number 1 denotes an image transfer device, lower and upper heat rollers 41 and 42 are provided opposite in the image transfer device 1, and lower and upper nip rollers 51 and 52 are provided opposite downstream. A heat cover 4 covers the periphery of the heat rollers 41 and 42 to prevent the heat dissipation of the heat rollers 41 and 42 and further, a transfer cover 5 for protection including the nip rollers 51 and 52 covers the outside. An insertion table 2 is provided on the side of an entrance of the image transfer device 1 and in the meantime, an ejection table 3 is provided on the side of the ejection.

Each heat roller 41, 42 is made of aluminum for example, the peripheral surface is coated with a coating layer made of rubber and others and a heater is provided in the center of each heat roller 41, 42. Of the lower and upper heat rollers 41 and 42 provided opposite, one (for example, the lower roller) is for driving and the other roller (the upper roller) is driven. Overlapped paper and image receiving sheet are passed between the lower and upper heat rollers 41 and 42, being heated and pressed, an image on the image receiving sheet is transferred on the paper, afterward, image receiving sheet base material and others are manually peeled from the paper and the image on the paper is acquired.

FIG. 7 is an explanatory drawing for explaining the shape and others of the pair of heat rollers 41 and 42 shown in FIG. 6 in detail. The heat roller 41 is a driving roller of a straight type having the length of 400 [mm]. That is, each diameter $\phi$1L and $\phi$1R of both ends of the heat roller and the diameter $\phi$1C of the central part are all equal, such as a cylindrical type 35.8 [mm] in diameter for example. The heat roller 42 is a driven roller of a crown type having the length of 400 [mm]. That is, the diameter $\phi$2C of the central part is slightly longer than each diameter $\phi$2L and $\phi$2R, 35.8 [mm] for example, of both ends of the heat roller such as a barrel type 36.1 [mm] in diameter for example. Each heat roller 41, 42 is coated with silicone rubber 60 degrees in hardness (JIS hardness A).

Also, the force of 200±40 [N] is respectively applied to both ends of the upper heat roller 42 as pressure P.

Even if the center is slightly bent because each heat roller 41, 42 is supported by only both ends, uniform pressure can be applied to any part of each heat roller 41, 42 because of the combination of the straight type and the crown type.

Heretofore, an image was transferred by using such an image transfer device 1 by the following two methods.

1. In one method, an image receiving sheet R is overlapped on paper P, the overlapped sheet and paper are passed between the pair of heat rollers 41 and 42 as they are and an image of the image receiving sheet R is transferred on the paper P as shown in FIG. 8.

That is, as shown in FIG. 8, when the overlapped paper P and image receiving sheet R on the paper P are passed between the lower and upper heat rollers 41 and 42, they are passed, being heated and pressed, an image of the image receiving sheet R is transferred on the paper P, the paper is carried by the nip rollers 51 and 52 and is ejected onto the ejection table 3.

However, in this case, when the overlapped sheet and paper are passed, they are curved and irregular wrinkles are made. It is conceivable that the wrinkles or windings are made by difference in material between the paper P and the image receiving sheet R in expansion and contraction, in the coefficient of thermal expansion, in the coefficient of moisture absorption between the paper P and the image receiving sheet R.

2. To solve such a problem, this applicant developed a method of using an image transfer device carrier as another method. FIG. 9 shows a transfer method of using this image transfer device carrier.

As shown in FIG. 9, a reference number 9 denotes an image transfer device carrier. The image transfer device carrier includes a carrier board 91 made of aluminum 0.3 [mm] thick, a cover sheet 92 covering only the vicinity of the end in a traveling direction of the carrier board 91 and made of polyimide 0.2 [mm] thick and a heat-resistant tape 93 for fixing the cover sheet 92 to the carrier board 91.

When the image transfer device carrier 9 is used, the cover sheet 92 is first lifted, overlapped paper P and image receiving sheet R are inserted between the cover sheet 92 and the carrier board 91. Next, the cover sheet 92 is returned to the original position and the overlapped image receiving sheet and paper are passed between the pair of heat rollers 41 and 42 with the surface and the back of the overlapped image receiving sheet and paper held between the pair of heat rollers and the side of the heat-resistant tape 93 at the head.

As the paper P and the image receiving sheet R are passed between the heat rollers 41 and 42 with the paper and the image receiving sheet held between the carrier board 91 and the cover sheet 92 and in the image transfer device carrier 9 when the image transfer device carrier is used as described above, the problem of windings is solved.

However, though the problem of windings is solved when the image transfer device carrier 9 is used as described above, the transmission of heat is deteriorated because heat is absorbed in the aluminum board, therefore the velocity of passage is required to be slowed up to approximately 1/10 of conventional passage speed or the temperature of the heat roller is required to be set so that it is higher, compared with the proper temperature, used electric power is increased, the heat insulated structure becomes large-scale and the heat-proof temperature of used members is required to be raised.

Also, as the image transfer device carrier 9 is normally made of aluminum, a carriage path cannot be bent and the miniaturization of the whole device is prevented.

Then, this applicant further invented an image transfer method and an image transfer device thereof in which no winding is made and in addition, the quantity of used electric power is normal at normal passage speed respectively without using the image transfer device carrier formerly and applied as U.S. patent application Ser. No. 09/639,161.

Thereby, in an image transfer device that overlaps an image receiving sheet where an image is formed and paper for the image to be transferred, passes them between a pair of heat rollers from an insertion table and transfers the image formed on the image receiving sheet on the paper, the image receiving sheet is first put on the insertion table, and paper overlapped on the image receiving sheet and the image receiving sheet are inserted between the pair of heat rollers.

Referring to FIG. 2, the image transfer method according to the background art will be briefly described below.

As shown in FIG. 2, a reference number 1 denotes an image transfer device. The image transfer device includes a pair of heat rollers 41 and 42, a heat cover 4 for covering the heat rollers 41 and 42, a pair of nip rollers 51 and 52, a protective cover 5 that covers the heat cover 4 and the pair of nip rollers 51 and 52, an insertion table 2 and an ejection table 3. Also, another pair of nip rollers may be provided outside the heat cover 4 on the upstream side of the pair of heat rollers 41 and 42 and hereby, the overlapped image receiving sheet and paper can be securely nipped. Also, the pair of nip rollers 51 and 52 can be also omitted.

R on the insertion table 2 of the image transfer device 1 denotes an image receiving sheet where an image is formed and P overlapped on the image receiving sheet R denotes paper for the image to be transferred. That is, according to the image transfer method according to the background art, as shown in FIG. 5, relationship between the paper and the image receiving sheet is reverse to the conventional relationship. In the conventional image transfer method shown in FIG. 8, the image receiving sheet R where an image is formed is overlapped on paper P for the image to be transferred, however, to the contrary, in the background art, that paper P is overlapped on the image receiving sheet R. As described above, as paper often including humidity is put on the upper side when the image receiving sheet R is first put on the insertion table 2 and is inserted into the image transfer device with the paper P overlapped on the image receiving sheet R, moisture included in the paper becomes water vapor and gets away upward even if the paper is heated by the heat rollers 41 and 42 and no wrinkle or windings is made.

In this case, as to positional relationship between the image receiving sheet R and the paper P, it is desirable that the paper P is inserted by L1 (L1=21 [mm]) or more before the image receiving sheet R as shown in FIG. 2. Hereby, only the paper P is passed previously, next a part of the paper overlapped with the image receiving sheet R is passed and failure of paper feed (normally called a jam) is reduced.

As described above, according to the background art, as moisture included in the paper gets away upward by putting the paper on the upper side, wrinkles or windings are hardly caused.

However, particularly in case environmental humidity is 60[%] or more and high, wrinkles or windings may be caused on thin paper the basis weight of which is 90 [g/m$^2$] or less.

SUMMARY OF THE INVENTION

In view of the foregoing problems, an object of the invention is to provide an image transfer method and a carrier sheet, which is prevented from such wrinkles or windings being made.

To solve the problem, an image transfer method according to a first aspect of the invention is based upon an image transfer method of overlapping an image receiving sheet where an image is formed and paper for the image to be transferred, passing them between a pair of heat rollers and transferring the image formed on the image receiving sheet on the paper and is characterized in that paper overlapped with an image receiving sheet and a hygroscopic or moisture permeable flexible carrier sheet further overlapped on them are inserted between a pair of heat rollers.

Also, an image transfer method according to a second aspect of the invention is characterized in that a flexible carrier sheet the basis weight of which is larger than that of paper is used.

An image transfer method according to a third aspect of the invention is characterized in that fixer which fixes the end of paper is provided to the end of the flexible carrier sheet and for the fixer, concretely, according to a fourth aspect of the invention, a repealable and rebondable adhesive is applied to at least the end of the flexible carrier sheet, according to a fifth aspect of the invention, a holder for holding the end of paper is fixed to the end of the flexible carrier sheet, according to a sixth aspect of the invention, for a concrete example of the holder, an adhesive tape is used and according to a seventh aspect of the invention, the end of the flexible carrier sheet is bent.

BRIEF DESCRIPTION OF THE DRAWINGS

FIG. 3 shows the result of comparison between the embodiment and an example for comparison;

DETAILED DESCRIPTION OF THE PREFERRED EMBODIMENTS

Figure 1:
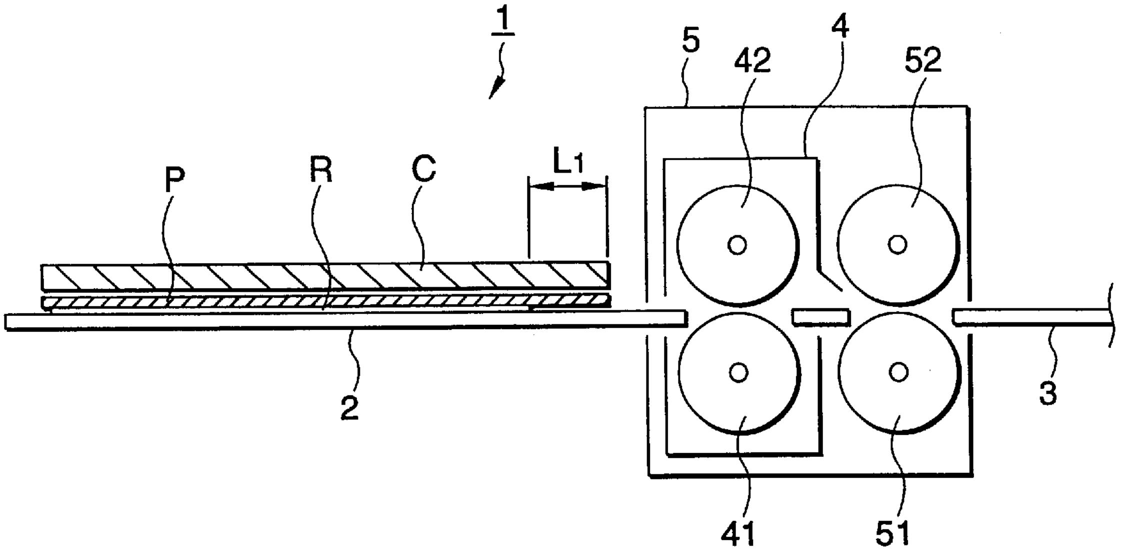
FIG. 1 is an explanatory drawing for explaining a first embodiment of the invention using an image transfer device.
Figure 2:
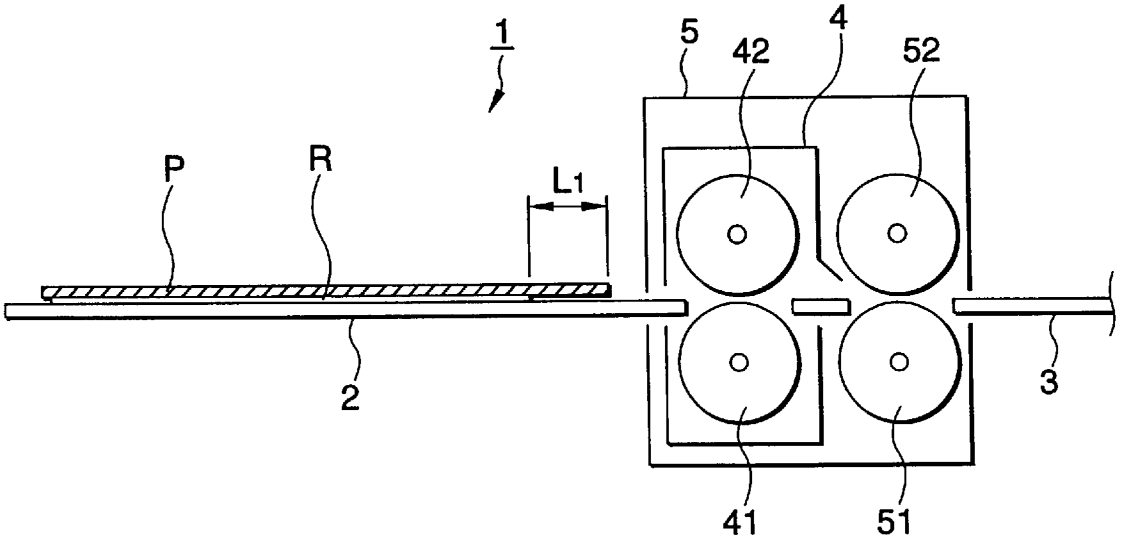
FIG. 2 is an explanatory drawing for explaining an embodiment of the background art using an image transfer device.

FIG. 1 is an explanatory drawing for explaining a first embodiment of the invention using an image transfer device.

As shown in FIG. 1, a reference number 1 denotes the image transfer device. The image transfer device includes a pair of heat rollers 41 and 42, a heat cover 4 covering them, a pair of nip rollers 51 and 52, a protective cover 5 that covers the heat cover 4 and the pair of nip rollers 51 and 52, an insertion table 2 and an ejection table 3.

An image receiving sheet R where an image is formed is put on the insertion table 2 of the image transfer device 1 and a paper P which is paper for the image to be transferred is overlapped on it. According to the invention, a flexible and hygroscopic or moisture permeable carrier sheet C is further overlapped on them.

Even if the end of the image receiving sheet R and the end of the paper P are slightly curled, the end of the paper P and the end of the image receiving sheet R are hardly separated because of the weight of the carrier sheet C by overlapping as described above, the image receiving sheet R and the paper P are carried with them overlapped and either is never wound on the heat roller.

The reason why the carrier sheet C is flexible is to solve the defect of the aluminum carrier in the embodiment of the conventional type, the whole device can be miniaturized by making the carrier sheet of flexible material and bending a carriage path and also as the thermal transfer coefficient is never deteriorated, electric power is saved.

Also, the reason why the carrier sheet C is made of hygroscopic or moisture permeable material is to prevent wrinkles or windings from being caused by absorbing or transmitting water vapor in the carrier sheet even if paper often including humidity is heated by the heat rollers 41 and 42 and moisture included in the paper comes out to be the water vapor as described above. For such a hygroscopic carrier sheet C, paper is optimum. However, the carrier sheet may be made of any substance only if it is flexible and hygroscopic in addition to paper and for example, it may be also firm fabric.

The case that moisture included in the paper is absorbed in hygroscopic material is described above, however, the similar effect is acquired even if the carrier sheet is made of a substance in which moisture is transmitted without absorbing water vapor. For example, minute mesh made of plastic may be also used.

Conversely, as polyimide or PET is not hygroscopic and not moisture permeable even if moisture included in the paper P comes out to be water vapor when the carrier sheet C is made of polyimide or PET, moisture accumulates between the paper P and the carrier sheet C and finally, wrinkles or windings are caused. This polyimide sheet also has a defect that it itself is high-priced.

In this embodiment, the carrier sheet made of light coat paper and art paper has good results as shown in FIG. 3.

FIG. 3 shows the results of each comparative example and example of this embodiment in the type and the basis weight of paper, whether guide paper is used or not, the type and the basis weight of the guide paper in case the guide paper is used and the transferability and the determination of wrinkles at various passage speed (6 [mm/s], 10 [mm/s], 15 [mm/s] and 20 [mm/s]) from the left to the right.

The left side of "/" in the center of each field shows whether the transferability is acceptable or not and the right side of "/" shows whether the determination of wrinkles is acceptable or not. "X" shows that the result is acceptable and "X" shows that the result is unacceptable. Therefore, it is the most desirable that "○" is entered on both the left and right sides of "/", however, as to the occurrence of wrinkles, if "○" is entered on the right side, the result is satisfactory.

The comparative examples 1 to 3 show transfer by the method according to the background art in which no guide paper is used, in the comparative example 1, light coat paper the basis weight of which is 105 [g/m$^2$] is used, in the comparative example 2, light coat paper the basis weight of which is 79 [g/m$^2$] is used, in the comparative example 3, light coat paper the basis weight of which is 64 [g/m$^2$] is used and it can be known depending upon whether the basis weight is large or small whether wrinkles are caused or not.

Also, for the image receiving sheet, a first proof receiver sheet A3WL manufactured by Fuji Photo Film Co., Ltd. is used and a print printed by a first proof printer manufactured by it so that magenta is solid is used.

The comparative examples 1 to 3 in FIG. 3 show:

1. In the comparative example 1, when transfer speed is 6 or 10 [mm/s], many wrinkles are caused and the result is unacceptable, however, when transfer speed is 15 or 20 [mm/s], the occurrence of wrinkles decreases and the result is acceptable.

2. In the comparative example 2, when transfer speed is 6, 10 or 15 [mm/s], the result of wrinkles is unacceptable, however, when transfer speed is 20 [mm/s], the result is acceptable.

3. In the comparative example 3, when transfer speed is any of 6 to 20 [mm/s], many wrinkles are caused and the result is unacceptable.

It is clear from the description that though the result of wrinkles is acceptable even if no guide paper is used in case the paper is thick and the high-speed transfer of 20 [mm/s] is performed, the result of wrinkles is unacceptable in the other cases. That is, in case the paper is thin and transfer speed is slow, the result of wrinkles is unacceptable.

In the meantime, in examples of this embodiment 1 and 2 and the comparative example 4, a test using guide paper is made. For the guide paper, in the example 1, art paper the basis weight of which is 128 [g/m$^2$] is used, in the example 2, light coat paper the basis weight of which is 79 [g/m$^2$] is used and in the comparative example 4, light coat paper the basis weight of which is 64 [g/m$^2$] is used, and for the paper, thin and light coat paper which is used in above comparative example 3, where a wrinkle is readily caused and the basis weight of which is 64 [g/m$^2$] is used in any example.

The examples 1 and 2 and the comparative example 4 respectively shown in FIG. 3 show:

4. In the example 1, in case transfer speed is 10, 15 or 20 [mm/s], the result of wrinkles is acceptable.

5. In the example 2, when transfer speed is 6 or 10 [mm/s], the result of wrinkles is unacceptable, however, when transfer speed is 15 or 20 [mm/s], the result of wrinkles is acceptable.

6. In the comparative example 4, in case transfer speed is any of 6 to 20 [mm/s], many wrinkles are caused and the result is unacceptable.

The followings are concluded based upon the above-mentioned.

i) When the guide paper overlapped on the paper is used, the occurrence of wrinkles is greatly improved.

ii) The more the basis weight of the guide paper is than that of the paper, the better the guide paper is.

iii) Conversely, when the basis weight of the guide paper is the same as that of the paper, reverse effect is produced.

In the next example 3 and comparative example 5, thick paper is used and the same art paper as the paper in the comparative example 1 where a wrinkle is hardly caused and the basis weight of which is 105 [g/m$^2$] and large is used. And guide paper is used in both the example 3 and the comparative example 5, however, the example 3 and the comparative example 5 are different in the basis weight of used guide paper (art paper), and in the example 3, guide paper (157 [g/m$^2$]) the basis weight of which is large is used, while the basis weight of the guide paper in the comparative example 5 is the same as that of the paper (105 [g/m$^2$]).

The example 3 of this embodiment and the comparative example 5 show:

7. In the example 3, in case transfer speed is 10, 15 or 20 [mm/s], the result of wrinkles is acceptable.

8. In the comparative example 5, when transfer speed is any of 6, 10 or 15 [mm/s], many wrinkles are caused and the result is unacceptable.

The followings are concluded based upon the description.

i) In case the basis weight of guide paper is larger than that of the paper, the result of wrinkles is acceptable.

ii) Conversely, when the basis weight of the guide paper is the same as that of the paper, the result of wrinkles is unacceptable even if the paper has large basis weight in which a wrinkle is hardly caused.

Also, it is known based upon the examples of this embodiment 1 to 3 and the comparative examples 1 to 5 that the slower transfer speed is, the better the transferability is.

FIGS. 4 show a second embodiment of the invention.

FIGS. 4A to 4D show a state that paper P is put on an image receiving sheet R and a hygroscopic or moisture permeable flexible carrier sheet C is put on them.

In this case, the carrier sheet C is made paper the basis weight of which is larger than that of the paper P. In FIG. 1 showing the first embodiment of the invention, the hygroscopic or moisture permeable flexible carrier sheet C is merely put on the paper P, however, FIGS. 4A to 4D are different in that fixer is provided to prevent the end of the paper P from being separated.

Figure 4A:
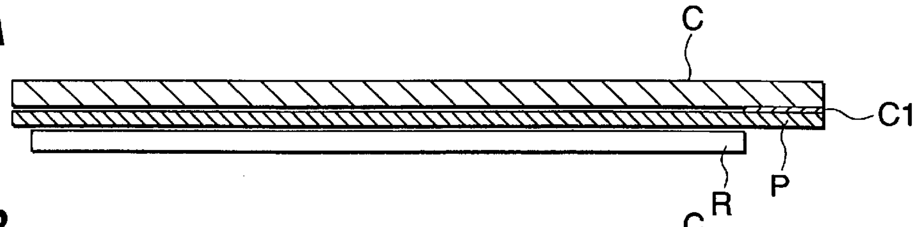
FIG. 4A, FIG. 4B, FIG. 4C and FIG. 4D show a second embodiment of the invention.
Figure 4B:
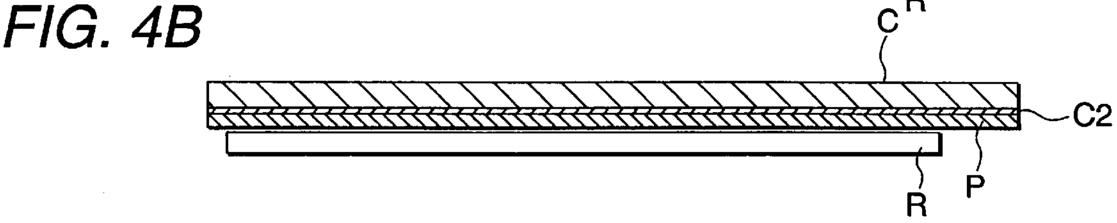

FIG. 4A shows a state that the end of the carrier sheet C and the end of the paper P are mutually fixed by an adhesive C1. FIG. 4B shows a state that the overall surface of the carrier sheet and the overall surface of the paper are mutually fixed by an adhesive C2. For the adhesives C1 and C2 in this case, a repealable and rebondable adhesive is used.

Hereby, every time new paper P is sent, the carrier sheet C can be put on the new paper P to prevent the end of the paper P from being separated, in addition, can be reused and is economical and efficient. As the overall surface of the carrier sheet and the overall surface of the paper are fixed as shown in FIG. 4B, the result of wrinkles is best, however, in the case that only the end of the carrier sheet C and the end of the paper P are fixed as shown in FIG. 4A, sufficient effect is also acquired.

Figure 4C:
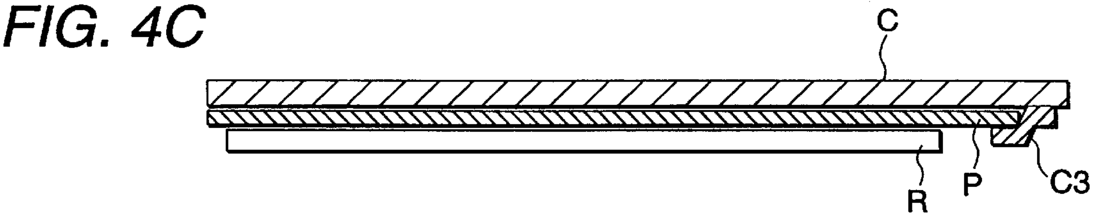

FIG. 4C shows an example that an adhesive tape is used for fixer C3 in place of the adhesive. The adhesive tape is bonded to the rear side of the end of the carrier sheet C and the end of the paper P. Hereby, the end of the paper P is not allowed to separate. In this case, it is desirable that the adhesive tape is repealable and rebondable one.

For an example of the fixer C3, the adhesive tape is used in this embodiment, however, a holder or the like in which a non adhesive tape itself is permanently fixed to the rear side of the end of the carrier sheet C may be also used. In the case of such a holder, the end of the paper P is inserted between the carrier sheet C and the holder C3 in operation.

Figure 4D:
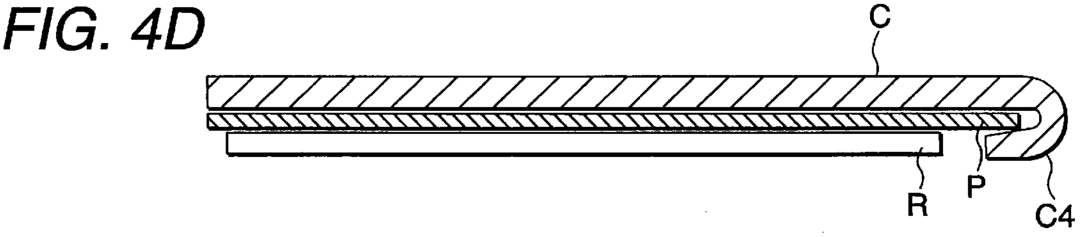
Figure 5:
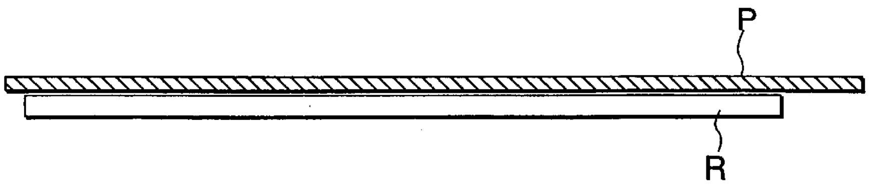
FIG. 5 shows relationship between paper and an image receiving sheet in an image transfer method according to the background art.
Figure 6:
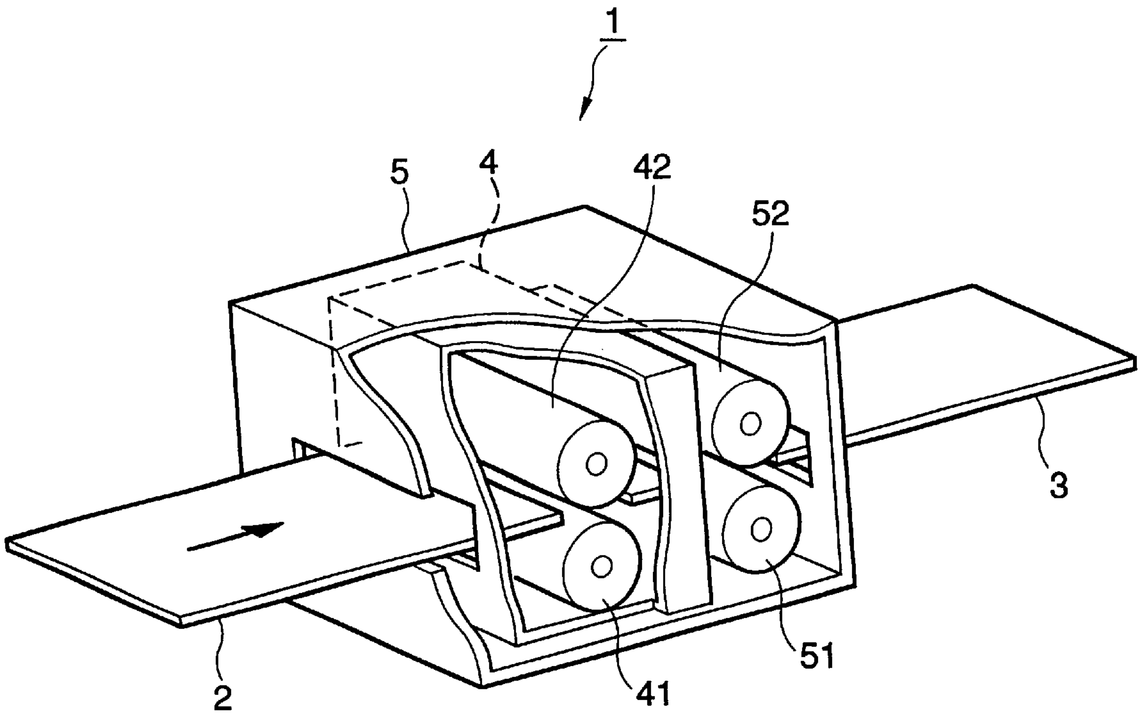
FIG. 6 is a partially sectional perspective view showing the appearance of the image transfer device.
Figure 7:
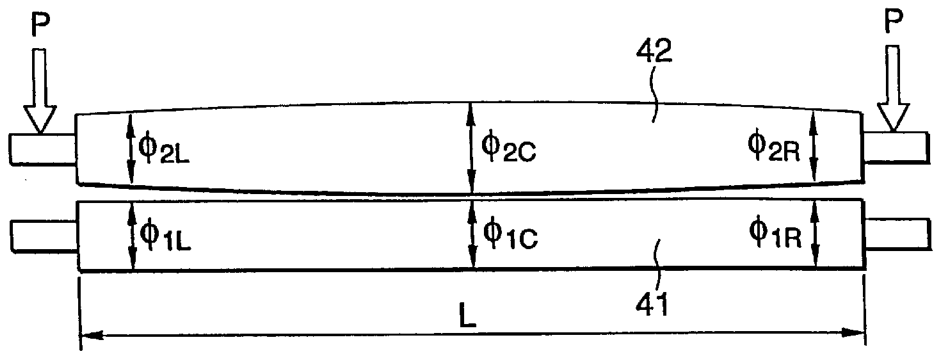
FIG. 7 is an explanatory drawing for explaining the shape and others of a pair of heat rollers 41 and 42.
Figure 8:
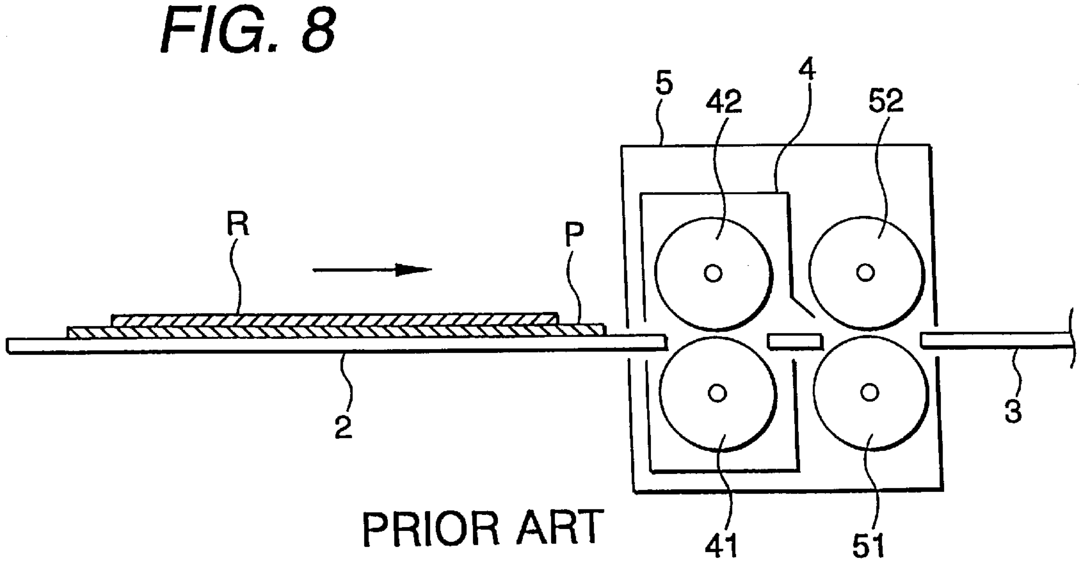
FIG. 8 is an explanatory drawing for explaining a conventional type first image transfer method.
Figure 9:
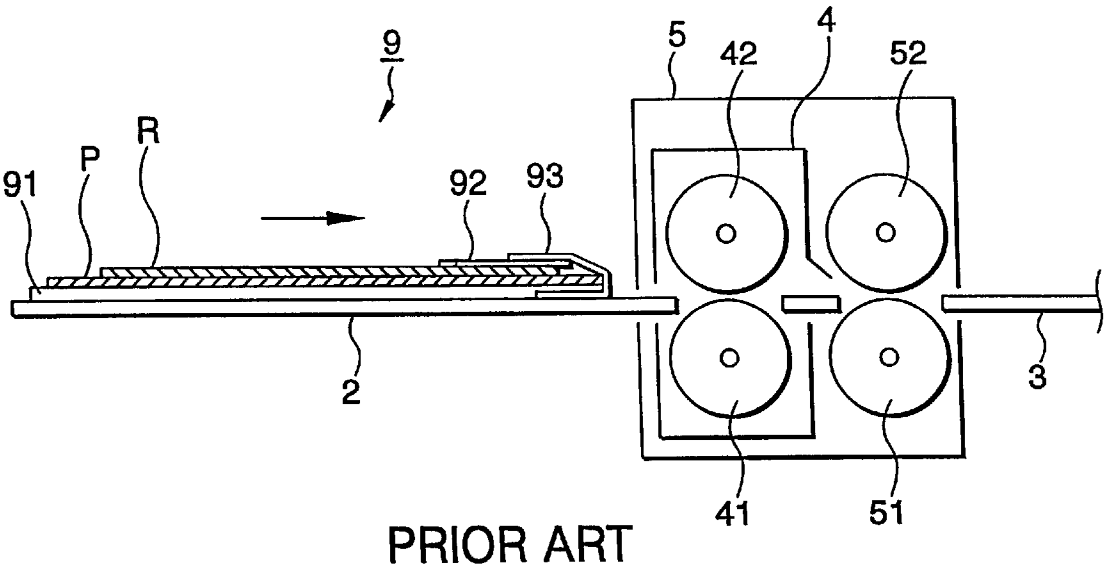
FIG. 9 is an explanatory drawing for explaining a conventional type second image transfer method.

In FIG. 4D, a bent part C4 made by bending the end of the carrier sheet C is used for the fixer C3. In operation, the end of the paper P is inserted into clearance between the body of the carrier sheet and the bent part C4.

As described above, according to the second embodiment of the invention, even if the end of the paper is slightly curled, a jam is hardly caused by the action of the fixer of the carrier sheet C.

In the image transfer method in which the image receiving sheet and the paper are overlapped, are passed between the pair of heat rollers and an image formed on the image receiving sheet is transferred on the paper, as the image receiving sheet first put, the paper overlapped on the image receiving sheet and the hygroscopic or moisture permeable flexible carrier sheet further overlapped on them are inserted between the pair of heat rollers, a wrinkle or a winding is prevented from being caused even if the basis weight of the paper P is 90 [g/m$^2$] or less.

As the end of the paper P is prevented from being separated by providing the fixer to the end of the flexible carrier sheet, no jam is caused.

What is claimed is:

1. An image transfer method in which an image receiving sheet where an image is formed and a paper for the image to be transferred are overlapped, are passed between a pair of heat rollers and the image formed on the image receiving sheet is transferred on the paper, comprising steps of:

overlapping a paper on the image receiving sheet;

overlapping flexible carrier sheet having a hygroscopic property or moisture permeability on the paper; and inserting the overlapped paper, image receiving sheet and flexible carrier between the pair of heat rollers.

2. An image transfer method according to claim 1, wherein the carrier sheet is a paper of which the basis weight is larger than that of the paper for the image to be transferred.

3. An image transfer method according to claim 1, wherein fixer which fixes the end of the paper is provided to the end of the carrier sheet.

4. An image transfer method according to claim 3, wherein the fixer is a repealable and rebondable adhesive applied to at least the end of the carrier sheet.

5. An image transfer method according to claim 3, wherein the fixer is a holder for holding the end of the paper between the holder and the carrier sheet.

6. An image transfer method according to claim 5, wherein the holder includes an adhesive tape.

7. An image transfer method according to claim 3, wherein the fixer includes a bent part made by bending the end of the carrier sheet.

* * * * *